US008844000B2

(12) United States Patent
McSchooler et al.

(10) Patent No.: US 8,844,000 B2
(45) Date of Patent: *Sep. 23, 2014

(54) APPARATUS, SYSTEMS AND METHODS FOR MEDIA CONTENT DELIVERY

(71) Applicant: EchoStar Broadcasting Corporation, Englewood, CO (US)

(72) Inventors: Jeffrey McSchooler, Parker, CO (US); Josh Stumbo, Cheyenne, WY (US); Robert Crawford, Cheyenne, WY (US)

(73) Assignee: EchoStar Broadcasting Corporation, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,113

(22) Filed: Sep. 30, 2013

(65) Prior Publication Data

US 2014/0033283 A1    Jan. 30, 2014

Related U.S. Application Data

(63) Continuation of application No. 12/820,394, filed on Jun. 22, 2010, now Pat. No. 8,549,583.

(51) Int. Cl.
| | |
|---|---|
| *G06F 7/04* | (2006.01) |
| *H04N 21/61* | (2011.01) |
| *H04N 21/2665* | (2011.01) |
| *H04H 60/07* | (2008.01) |
| *H04L 29/06* | (2006.01) |
| *H04N 21/462* | (2011.01) |
| *H04B 7/185* | (2006.01) |

(52) U.S. Cl.
CPC ............ *H04L 65/60* (2013.01); *H04N 21/6143* (2013.01); *H04N 21/6125* (2013.01); *H04N 21/2665* (2013.01); *H04B 7/18523* (2013.01); *H04H 60/07* (2013.01); *H04L 63/08* (2013.01); *H04N 21/4622* (2013.01)
USPC .................................. 726/3; 380/231; 725/25

(58) Field of Classification Search
USPC .................................. 726/3; 380/231; 725/25
See application file for complete search history.

(56) References Cited

U.S. PATENT DOCUMENTS

| | | | |
|---|---|---|---|
| 2009/0279701 A1* | 11/2009 | Moisand et al. | 380/270 |
| 2010/0037253 A1 | 2/2010 | Sheehan et al. | |
| 2011/0083146 A1* | 4/2011 | Bruckman et al. | 725/36 |
| 2011/0119719 A1* | 5/2011 | Morzos | 725/85 |

* cited by examiner

*Primary Examiner* — Teshome Hailu
*Assistant Examiner* — Abiy Getachew
(74) *Attorney, Agent, or Firm* — Lowe Graham Jones PLLC

(57) ABSTRACT

A media content delivery system and method is operable to communicate an authorized single media content stream generated by a local programming provider (LPP) in a domestic market area (DMA) to a client facility, wherein the authorized single media content stream is multiplexed into a multi-media content stream with a plurality of other single media content streams generated by a plurality of other LPPS in the DMA. An exemplary embodiment identifies an authorized single media content stream of interest to a client; accesses the multi-media content stream communicated from a communication network at the client facility, unbundles the authorized single media content stream from the received multi-media content stream, and communicates the authorized single media content stream to a program content generation system operated by the client.

20 Claims, 2 Drawing Sheets

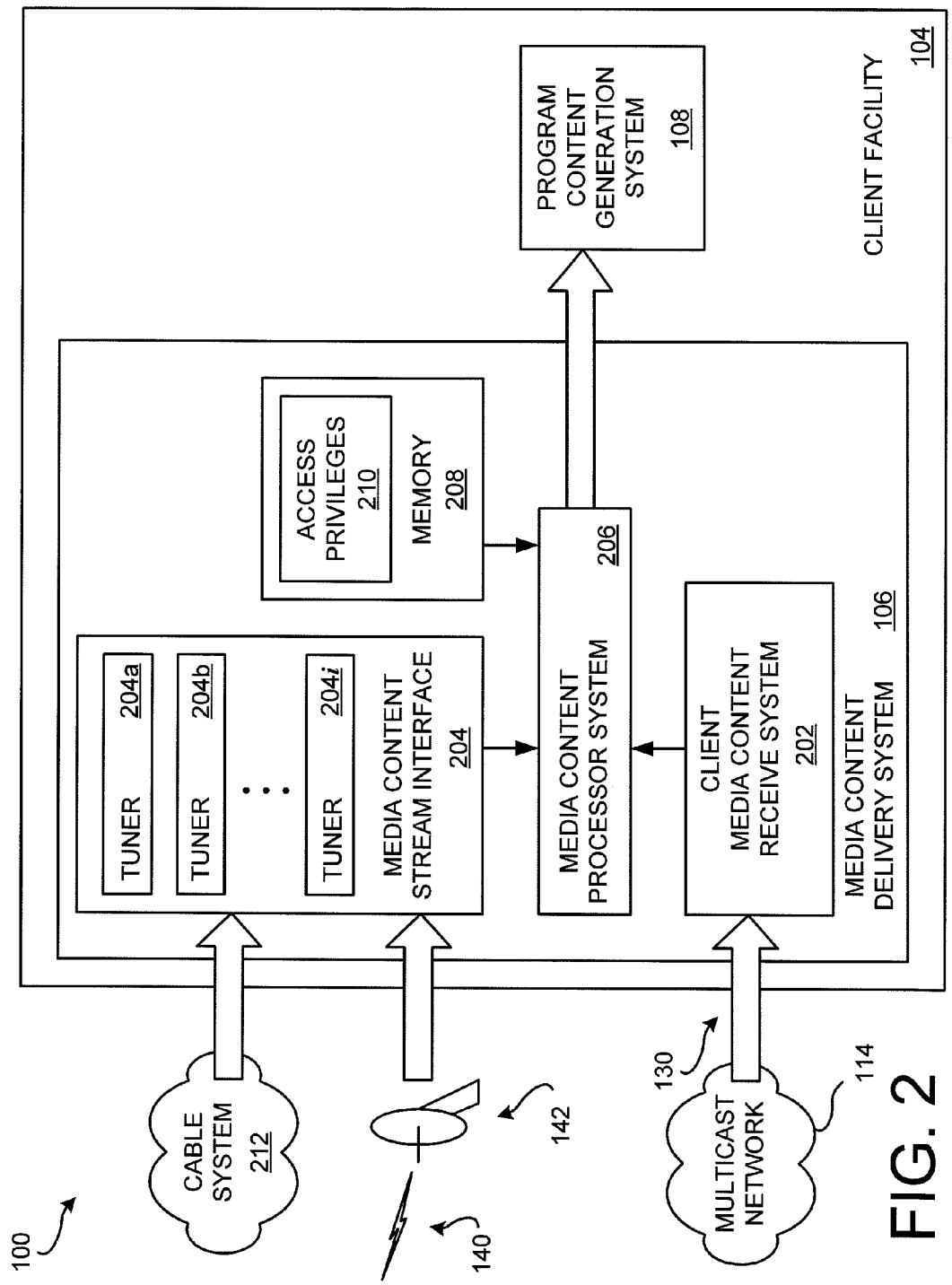

APPARATUS, SYSTEMS AND METHODS FOR MEDIA CONTENT DELIVERY

PRIORITY CLAIM

This patent application is a Continuation of U.S. Non-Provisional patent application Ser. No. 12/820,394, filed Jun. 22, 2010, published as U.S. Publication No. 2011/0314519, entitled "APPARATUS, SYSTEMS AND METHODS FOR MEDIA CONTENT DELIVERY," and issued as U.S. Pat. No. 8,549,583 on Oct. 1, 2013, the content of which is herein incorporated by reference in its entirety.

BACKGROUND

National newscast entities prepare national news broadcasts or other programs of interest that are presented to a nationwide audience via a programming channel controlled by that particular national newscast entity. For example, if a newsworthy event of interest occurs in a small town in Colorado, the national newscast entity may wish to include a story regarding the newsworthy event in a newscast. The national newscast entity may obtain a report on the event from a local program provider that is initially reporting on the local event. The local report on the newsworthy event may then be incorporated into the national newscast entity's newscast.

One method currently used to obtain local reports on a newsworthy event is to have a local agent record all local newscasts. When the national newscast entity desires the report for incorporation into their national news broadcast or other program, the national newscast entity contacts the local agent. The local agent then manually retrieves the media content corresponding to the portion of the local newscast pertaining to the newsworthy event, and then sends that media content to the national newscast entity. Such media content may be sent in a variety of manners, such as over the Internet or over a dedicated communication path. However, this process is time consuming, cumbersome and expensive. Often, the received quality of the media content has been degraded due to the storage medium and/or the communication medium that is used to send the media content to the national newscast entity.

Another currently used method to obtain local media content pertaining to the newsworthy event is to have local uplink facilities to directly broadcast the local newscasts to the national newscast entity. The broadcasting of the local newscast may occur over a dedicated communication path, such as a satellite transmission path, a dedicated cable path, or the like. However, since there are so many different local program providers, the cost of provisioning so many different uplink facilities is prohibitively expensive.

Accordingly, there is a need in the arts to provide media content access in a more efficient manner and at a reduced cost.

SUMMARY

Systems and methods of delivering media content are disclosed. An exemplary embodiment is operable to communicate an authorized single media content stream generated by a local programming provider (LPP) in a domestic market area (DMA) to a client facility, wherein the authorized single media content stream is multiplexed into a multi-media content stream with a plurality of other single media content streams generated by a plurality of other LPPS in the DMA. An exemplary embodiment identifies an authorized single media content stream of interest to a client; accesses the multi-media content stream communicated from a communication network at the client facility, unbundles the authorized single media content stream from the received multi-media content stream, and communicates the authorized single media content stream to a program content generation system operated by the client.

In accordance with further aspects, an exemplary embodiment unbundles the single media content streams from the received multi-media content streams; identifies an authorized single media content stream of interest to a client from the plurality of unbundled single media content streams; generates a special service transport channel, wherein the authorized single media content stream resides in the special service transport channel; and communicates the special service transport channel with the authorized single media content stream to the client facility.

BRIEF DESCRIPTION OF THE DRAWINGS

Preferred and alternative embodiments are described in detail below with reference to the following drawings:

FIG. 2 is a block diagram of an embodiment of the media content delivery system implemented at the client facility.

DETAILED DESCRIPTION

Figure 1:
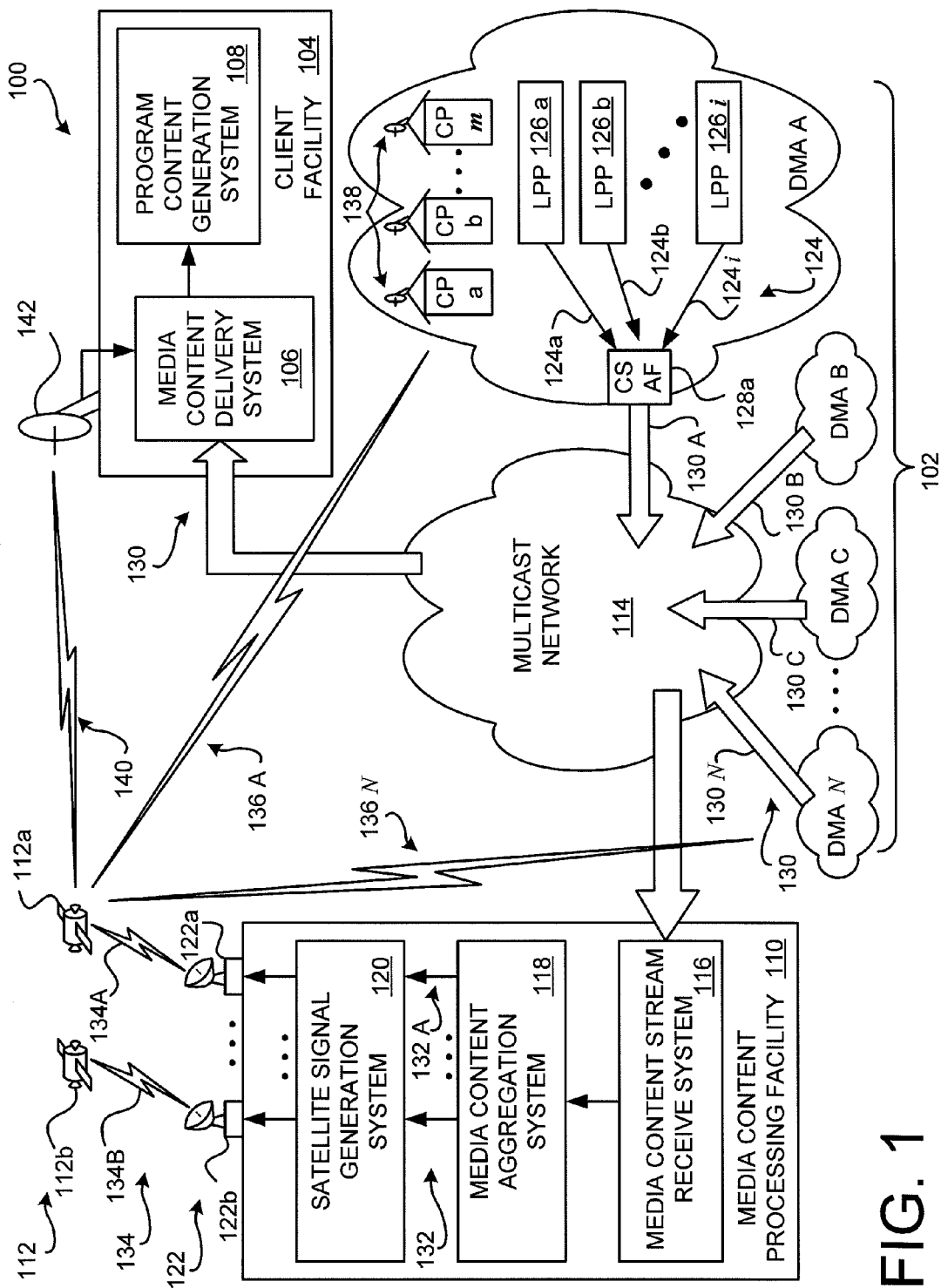
FIG. 1 is a block diagram of an embodiment of a media content delivery system configured to provide local media content originating in a plurality of domestic market areas (DMAs) to a client facility.

FIG. 1 is a block diagram of an embodiment of a media content delivery system 100 configured to provide media content originating in a plurality of domestic market areas (DMAs) 102 to a client facility 104. The local media content from the DMAs 102 is communicated to a media content delivery system 106. The client facility 104 may select local media content of interest from one or more of the DMAs 102 for further processing by their program generation system 108.

For example, the client facility 104 may be operated by a client that is a national newscast entity which produces a national newscast of domestic and international newsworthy stories. A local program provider (LPP) may produce local newscast programming for their particular DMA covering the newsworthy story. The newsworthy story program produced by the LPP may incorporate video and/or audio content, the media content, pertaining to the newsworthy event. The national newscast entity may wish to incorporate part of, or all of, the video and/or audio media content produced by the LPP when they produce their story about the newsworthy event.

A satellite-based media content delivery system 100 comprises a plurality of DMAs 102, at least one media content processing facility 110, a plurality of communication satellites 112, and a multicast network 114. Alternative embodiments may communicate over other packet-based networks, such as, but not limited to, a unicast network, a broadcast network, or an anycast network. Generally, These various packet-based communication networks may be referred to herein as the communication network 114.

The media content processing facility 110 comprises a media content stream receive system 116, a media content aggregation system 118, a satellite signal generation system 120, and a plurality of satellite uplink antennas 122.

A first embodiment of the media content delivery system 100 is configured to acquire local media content by accessing the local media content that is communicated over the multicast network 114. A dedicated node is provided at the client facility 104 to provide access to the multicast network 114. A second embodiment of the media content delivery system 100 is configured to receive one or more satellite signals that have the local media content. A unique transport stream with local media content is generated at the media content processing facility 110, and is then delivered to the client facility 104 via a satellite signal.

In overview, processes and systems that acquire local media content are now described. At least one single media content stream 124 is produced by each of a plurality of local programming providers (LPPs) 126 in each of the DMAs 102. A content stream aggregation facility (CSAF) 128 residing in each of the DMAs 102 receives the single media content streams 124 from each of the LPPs 126 in that particular common DMA 102. The CSAF 128 multiplexes the received single media content streams 124 into one or more multi-media content streams 130.

The aggregated media content streams 130 from each of the DMAs 102 are communicated to the media content processing facility 110 over the multicast network 114. The media content processing facility 110 is operated by a program content provider. The multicast network 114 may be any suitable communication system that is configured to direct and carry data between network nodes. An exemplary multicast network 114 is based on an open system interconnection (OSI) model that employs labeled packets of digital data. An exemplary multicast network 114 is a fiber optics based system to connect the nodes of the multicast network 114.

For example, in the exemplary DMA "A" 102 of FIG. 1, a first LLP 126a provides a first single media content stream 124a to the CSAF 128a. Similarly, the single media content streams 124b-124i are communicated to the CSAF 128a located in the DMA "A" 102. The CSAF 128a aggregates the received single media content streams 124a-124i into at least one multi-media content stream 130a. The at least one multi-media content stream 130a is communicated onto the multicast network 114 by the CSAF 128a.

In practice, there are many DMAs 102 providing media content. In the United States, there are currently over two hundred DMAs 102. Further, the plurality of media content processing facilities 110 may be communicatively coupled to the multicast network 114. Each of the media content processing facilities 110 may receive any of, or all of, the multi-media content streams 130 that are available on the multicast network 114.

To manage communication of the multi-media content stream 130, the content of the multi-media content stream 130 is packetized for communication over the multicast network 114. Each packet comprises a header and the packetized content. The header provides identification information pertaining to the contents of the communicated packet. For example, but not limited to, a header may include a multicast group identifier (corresponding to the identity of the program content provider), a port identifier (corresponding to the identity of the particular source CSAF 128), a source address (corresponding to the identity of the LPP 126 originating the content), and a program identifier or PID (corresponding to information that identifies the particular program content).

The media content stream receive system 116 at the media content processing facility 110 receives the plurality of multi-media content streams 130 that are available over the multicast network 114. Then, the media content stream receive system 116 unbundles the received multi-media content streams 130 into the original plurality of single media content streams 124. The original plurality of single media content streams 124 are communicated from the media content stream receive system 116 to the media content aggregation system 118.

The unbundling of the single media content streams 124 from the multi-media content streams 130 may be performed in any suitable manner. An exemplary embodiment employs signal de-multiplexing based upon the header and packet identifiers associated with each of the single media content streams 124.

The media content aggregation system 118 then aggregates selected ones of the plurality of single media content streams 124, along with selected national media content streams, into one or more transport channels 132. That is, selected ones of the plurality of single media content streams 124 are multiplexed or otherwise combined into one or more of the transport channels 132. Examples of national media content streams may include premium service channels, sports channels, news channels, or the like that are provided to all of the DMAs 102. Each one of the particular transport channels 132 with selected local and national media content streams are configured for a particular destination DMA 102. The transport channels 132 are communicated from the media content aggregation system 118 to the satellite signal generation system 120.

The satellite signal generation system 120, for each of the transport channels 132, generates a transport channel satellite signal 134 that is provided to a selected one of the satellite uplink antennas 122. The satellite uplink antennas 122 then uplink the transport channel satellite signal 134 to the satellite 112 that it is broadcasting to. Customers receive one or more satellite signals 136 having the aggregated local and national media content streams at a satellite antenna 138 located at their customer premises (CPs). The satellite antennas 138 may be configured to receive different satellite signals 136 from a plurality of different satellites 112 and/or from satellites broadcasting multiple satellite signals 136.

For example, with respect to the DMA "A" having the LPPs 126a-126i, the media content aggregation system 118 may aggregate a plurality of national media content streams of interest and a plurality of local media content streams 124a-124i into a unique transport channel 132A. However, the local media content streams 124 received from other DMAs 102 are not included in the transport channel 132A since customers in the DMA "A" 102 are not likely to be interested in local media content from other DMAs 120.

The transport channel generation system 120 the provides the transport channel 132A destined for the DMA "A" 120 to the satellite uplink antenna 122a. The satellite uplink antenna 122a communicates the transport channel satellite signal 134A to the satellite 112a. The satellite 112a communicates the received transport channel satellite signal 134A down onto the region of the earth that corresponds to the DMA "A" region as a satellite signal 136A. The satellite antennas 138 at the customer premises CPa-CPm receive the satellite signal 136A.

A first embodiment of the media delivery system 100 is configured to acquire local media content by selectively accessing the multi-media content streams 130 that have been communicated onto the multicast network 114 from the DMAs 102. In this exemplary embodiment, the client facility 104 has a media content delivery system 106 that is configured to access to the multicast network 114. Thus, the client facility 104 is a dedicated node on the multicast network 114.

The client operating the client facility 104 knows the identifier, such as the call letters or the like, of particular LPPs 126 that are providing local media content of interest. Accordingly, the particular one of the multi-media content streams 130 having the local media content of interest may be accessed by the client at their client facility 104. That is, the media content of interest is retrieved from the multicast network 114 as the media content is being communicated to the media content processing facility 110.

The received media content is then processed by the client's program generation system 108 in a desired manner. For example, the received media content may be processed into video and/or audio information segments that are then incorporated into programming that is produced by the client. Alternatively, or additionally, the received media content may be saved in a recording medium for later access.

In a second embodiment, those single media content streams 124 of interest to the client are identified as authorized single media content streams 124. The authorized single media content streams 124 are selected and aggregated into one or more special service transport channels 132 at the media content processing facility 110. In this embodiment, the special service transport channels 132 are predefined based upon which of the LPPs 126 that are of interest to the client. The special service transport channels 132 are communicated from the media content processing facility 110 to the media content delivery system 106 at the client facility 104.

In this exemplary second embodiment, as the plurality of multi-media content streams 130 are unbundled by the media content stream receive system 116, selected ones of the single media content streams 124 provided by the LPPs 126 of interest are aggregated by the media content aggregation system 118 into the special service transport channels 132. The special service transport channels 132 are communicated to a selected one of the satellite uplink antennas 122 that uplink a corresponding transport channel satellite signal 134 to one of the satellites 112 that are in reception range of the client facility 104. The satellite then broadcasts the satellite signal 140 that is received by a satellite antenna 142 at the client facility 104. The client's media content delivery system 106 then tunes to a desired local media content stream 124 that is currently of interest. The media content may then be processed by the client's program generation system 108 in a desired manner.

In alternative embodiments, the special service transport channels 132 may be generated in other manners and/or may be communicated to the client facility 104 in other manners using different communication media. For example, but not limited to, the special service transport channels 132 may be communicated to the client facility 104 over a cable system or the like using a wire-based medium.

FIG. 2 is a block diagram of an embodiment of the media content delivery system 100 implemented at the client facility 104. The exemplary client facility 104 comprises a client media content receive system 202, a media content stream interface 204, a media content processor system 206, and an optional memory 208. Memory 208 may be any suitable memory medium configured to store a plurality of access privileges 210 that define which of the plurality of single media content streams 124 may be accessed at the client facility 104. Memory 208 may be a standalone memory medium that is accessible only by the processor system 206, or may be implemented in another memory device that stores other information that is accessible by the processor system 206 and other devices (not shown).

In the first embodiment implemented at the client facility 104, the client media content receive system 202 is configured to acquire local media content by selectively accessing the multi-media media content streams 130 that have been communicated onto the multicast network 114 by the CSAFs 128. In effect, the client media content receive system 202 is a dedicated access node on the multicast network 114.

The client media content receive system 202 unbundles the accessed aggregated multi-media media content streams 130 into the plurality of single media content streams 124. The media content processor system 206 receives the single media content streams 124 and identifies those single media content streams 124 to which the client facility 104 is entitled to access. Identification of the authorized single media content streams 124 is based on information in the access privileges 210 stored in memory 208.

In an exemplary embodiment, access privileges to the authorized single media content streams 124 are provided based upon a listing of the identifiers of selected ones of the single media content streams 124. Those authorized single media content streams 124 that are listed in the access privileges 210 are accessible at the client facility 104. Single media content streams 124 that are not listed in the access privileges 210 are unauthorized single media content streams 124 that are not accessible by the client. In an exemplary embodiment, the processor system 206 communicates the authorized single media content streams 124 to the program content generation system 108 for further processing.

In practice, many different authorized single media content streams 124 may be available to the client. However, the client may only be interested in receiving one, or just a few of, the many authorized single media content streams for further processing. Since the client operating the client facility 104 knows the identifier, such as the call letters or the like, of particular LPPs 126 that are providing local media content of interest, those particular local media content streams 124 of particular interest may be identified for further processing by the client. That is, the identifier is specified such that the client media content receive system 202 accesses those multi-media content streams 130 of particular interest to the client.

The client media content receive system 202, in some embodiments, may be configured substantially the same as, or similar to, the media content stream receive system 116 located at the media content processing facility 110. Some embodiments of the client media content receive system 202 and/or the media content processor system 206 may include software and/or hardware that limits access to selected ones of the single media content streams 124 that are otherwise available on the multicast network 114.

In an exemplary embodiment, the client contracts for access privileges from the program content provider. Based upon selection of those single media content streams 124 of interest to the client, the client media content receive system 202 is configured to permit access to the selected ones of the authorized single media content streams 124. However, access privileges are denied for the single media content streams that are not selected. An exemplary embodiment employs a table or other suitable access management system to provide access to authorized single media content streams and to deny access to un authorized single media content streams.

For example, media content generated by the LLP 126a may be of interest to the client. In contrast, LPP 126b may not produce media content that is of interest. Accordingly, the client media content receive system 202 and/or the media content processor system 206 may be configured to provide access to the authorized single media content stream 124a generated by the LLP 126a, and may be further configured to deny access to the unauthorized single media content stream 124b generated by the LLP 126b (FIG. 1).

The second exemplary embodiment at the client facility 104 comprises a media content stream interface 204. The media content stream interface 204 comprises a plurality of tuners 204a-204i. Similar to tuners of a set top box that are configured to tune to a selected single media content stream 124 in a received satellite signal 136, each of the tuners 204a-204i are configured to selectively tune to one of the plurality of single media content streams 124 available in the satellite signal 140 that is received by the satellite antenna 142. The satellite signal 140 comprises one or more of the special service transport channels 132 that have the local media content generated by the LPPs 126 of interest to the client.

The special service transport channels 132 may be generated based upon the selection of the single media content streams 124 of interest to the client. Accordingly, the media content stream interface 204 may be configured to access all of the single media content streams 124 provided in one or more special service transport channels 132. The single media content streams 124 that are not of interest to the client are omitted from the generated special service transport channel 132. In this exemplary embodiment, omitted single media content streams 124 are considered as unauthorized single media content streams 124.

Alternatively, or additionally, access to selected ones of the single media content streams 124 in the received special service transport channels 132 may require optional authorization at the client facility 104. Thus, when the special service transport channels 132 are initially generated at the media content processing facility 110, some selected ones of the unauthorized single media content streams 124 may be added into the special service transport channels 132 by the program content provider in anticipation that the client may become interested in those unauthorized single media content streams 124 at a later time.

In such an exemplary embodiment, access privileges are controlled by the program content provider and may be denied for the unauthorized single media content streams 124 that are not selected by the client. An exemplary embodiment employs a table or other suitable access management system to provide access to authorized single media content streams 124 and to deny access to unauthorized single media content streams 124. In the event that the client wishes to have access to one or more of the unauthorized single media content streams 124 already in the special service transport channels 132, access may be granted by modifying the access table or other access management system. Similarly, access may be changed from authorized to denied at a later date for selected single media content streams 124.

For example, authorization may be optionally performed by the media content processor system 206 that is controlling the plurality of tuners 204a-204i. For example, the client may be interested in the single media content stream 124b generated by the LLP 126b, and accordingly, the single media content stream 124b is included in the generated special service transport channel 132. Here, the tuners 204a-204i are permitted to tune to the single media content stream 124b.

However, at a later date, the client may not be interested in access to the single media content stream 124b generated by the LLP 126b. Accordingly, the access privileges 210 may be defined so as to deny access to the single media content stream 124b generated by the LLP 126b. Here, the tuners 204a-204i are no longer permitted to tune to the single media content stream 124b.

In an alternative embodiment, one or more of the special service transport channels 132 are communicated to the client facility 104 using a wire-based medium, for example, the wire-based medium may be communicated over a cable system 212 or the like.

Embodiments of the media content stream interface 204 may include any suitable number of tuners 204a-204i. For example, one client may elect to have access to ten single media content streams 124 at any particular time. Accordingly, the media content stream interface 204 would include ten tuners.

Some client facilities 104 may implement both the client media content receive system 202 and the media content stream interface 204 at a single client facility 104. For example, one or more plurality of single media content streams 124 may not be available over the multicast network 114. Such single media content streams 124 may be provided to the client facility 104 via the satellite signal 140 or another suitable medium.

It should be emphasized that the above-described embodiments of the media content delivery system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that communicates a plurality of media content streams with content to a program content generation system operated by a client device, wherein each one of the plurality of media content streams are generated by one of a plurality of local programming provider (LPPs) residing in one of a plurality of domestic market areas (DMAs), and wherein of each one of the media content streams comprises a plurality of packets containing portions of the content, and wherein each packet includes a header with an identifier of the LLP that produced the media content stream, the method comprising: receiving, from a first plurality of LLPs, a first plurality of media content streams at a first content stream aggregation facility in a first DMA; multiplexing, at the first content stream aggregation facility, the received plurality of packets of each of the first plurality of media content streams into a first multi-media content stream; communicating the first multi-media content stream from the first content stream aggregation facility onto a communication network; receiving, from a second plurality of LLPs, a second plurality of media content streams at a second content stream aggregation facility in a second DMA, wherein the second DMA is different from the first DMA; multiplexing, at the second content stream aggregation facility, the plurality of packets of each of the second plurality of media content streams into a second multi-media content stream; communicating the second multi-media content stream from the second content stream aggregation facility onto the communication network; receiving, at a media content stream receive system, the first multi-media content stream and the second multi-media content stream via the communication network; identifying one of the media content streams in the received first multi-media content stream and the second multi-media content stream as an authorized media content stream that is of interest to the client, wherein the authorized media content stream is identified by the identifier that identifies the LLP that produced the authorized media content stream; unbundling the plurality of packets associated with the authorized media content stream from the received one of the first multi-media content stream and the second multi-media content stream based on the identifier of the LLP that produced the authorized media content stream; generating the authorized media content stream from the plurality of packets; and communicating the authorized media content stream to the program content generation system operated by the client.

2. The method of claim 1, wherein the first multi-media content stream and the second multi-media content stream are concurrently communicated onto the communication network.

3. The method of claim 1, wherein the first plurality of LLPs and the first content stream aggregation facility are commonly located within the first DMA.

4. The method of claim 1, wherein communicating the authorized media content stream to the program content generation system operated by the client comprises:
communicating the authorized media content stream onto the communication network,
wherein the authorized media content stream is received at the program content generation system via the communication network.

5. The method of claim 4, wherein the authorized media content stream is communicated to a plurality of program content generation systems each operable by one of a plurality of clients, the method further comprising:
granting access to the authorized media content stream to authorized ones of the plurality of clients based on the identifier of the LLP that produced the authorized media content stream; and
denying access to the authorized media content stream to unauthorized ones of the plurality of clients based on the identifier of the LLP that produced the authorized media content stream.

6. The method of claim 1, wherein the authorized media content stream is a first authorized media content stream with a first plurality of packets that are identified by the identifier of a first LLP in the first DMA that produced the first multi-media content stream, and further comprising:
identifying a second authorized media content stream of interest to the client, wherein the second authorized media content stream is identified by a second identifier that identifies a second LLP in the second DMA that produced the second authorized media content stream;
unbundling a second plurality of packets associated with the second authorized media content stream based on the second identifier of the second LLP; and
communicating the second authorized media content stream to the program content generation system operated by the client.

7. The method of claim 6, further comprising:
multiplexing the first plurality of packets and the second plurality of packets into a single authorized multi-media content stream, wherein the single authorized multi-media content stream then includes the first authorized media content stream and the second authorized media content stream; and
communicating the single authorized media content stream to the program content generation system operated by the client.

8. A method for communicating a plurality of authorized single media content streams to a client facility, the method comprising: client device receiving, at a media content processing facility, a plurality of multi-media content streams communicated over a network from a plurality of content stream aggregation facilities, wherein each of the multi-media content streams comprise a plurality of single media content streams that have been multiplexed together, wherein each of the plurality of single media content streams are generated by one of a plurality of local programming providers (LPPs) located in a common domestic market area (DMA), and wherein the LPPs in a particular DMA communicate their respective multi-media content stream to the content stream aggregation facility located in its respective DMA; unbundling, at the media content processing facility, the single media content streams from the received multi-media content streams; identifying one of the unbundled single media content streams as a single media content stream of interest to a client at the media content processing facility; generating a special service transport channel, wherein the single media content stream of interest resides in the special service transport channel, and wherein access to the single media content stream of interest requires authorization information; and communicating the authorization information to the client, wherein the client accesses the single media content stream of interest based on the authorization information.

9. The method of claim 8, further comprising:
communicating the special service transport channel onto the network, wherein the special service transport channel is received by the client via the network.

10. The method of claim 8, further comprising:
communicating the special service transport channel in a satellite signal to at least one satellite.

11. The method of claim 8, further comprising:
communicating the special service transport channel onto a cable system, wherein the special service transport channel is received by the client via the cable system.

12. The method of claim 8, further comprising:
wherein the plurality of the single media content streams generated by the plurality of LLPs in the common DMA are packetized into packets that are multiplexed into the multi-media content stream, and
wherein each packet includes a header with a unique identifier that identifies the LLP that generated the single media content stream of interest.

13. The method of claim 12, further comprising:
receiving the unique identifier that identifies the LLP that generated the single media content stream of interest,
wherein the authorization information includes the identifier.

14. The method of claim 12, wherein the client is a first client, and further comprising:
receiving a request from a second client, wherein the request is for authorization to receive the single media content stream of interest; and
communicating the authorization information to the second client in response to receiving the request,
wherein the second client accesses the single media content stream of interest based on the authorization information.

15. A media content system at a client facility for receiving a plurality of authorized single media content streams, comprising: a client device at a single media content stream receive system configured to: receive a plurality of multi-media content streams communicated over a network, wherein each of the multi-media content streams comprise a plurality of single media content streams each generated by a plurality of local programming providers (LPPs) in a common domestic market area (DMA), wherein the plurality of the single media content streams generated by the plurality of LLPs in the common DMA are packetized into packets that are multiplexed into one of the multi-media content streams at a content stream aggregation facility that is located in the same common DMA as the plurality of LLPs, wherein each packet includes a header with a unique identifier that identifies the LLP that produced the single media content stream and that includes a portion of the single media content streams provided by the identified LLP, and wherein the content stream aggregation facility communicates the respective single media content stream from its DMA onto the network; and unbundle the plurality of single media content streams from the received multi-media content streams; and a media content processor system configured to: identify a single media content stream of interest that is of interest to a client from the plurality of unbundled single media content streams, wherein the single media content stream of interest is identified based upon the unique multicast group identifier that identifies the LLP that produced the authorized single media content stream; and communicate the single media content stream of interest to a program content generation system operable by the client.

16. The media content system of claim 15, wherein the media content processor system is further configured to deny access to an unauthorized single media content stream multiplexed into one of the plurality of the multi-media content streams, wherein access is denied because the media content processor system does not have the unique identifier that identifies the LLP that produced the unauthorized single media content stream, and wherein the unauthorized single media content stream is not communicated to the program content generation system.

17. The media content system of claim 16, wherein the media content processor system is further configured to, at a later time, receive the unique identifier that identifies the LLP that produced the unauthorized single media content stream, identify the unauthorized single media content stream as authorized in response to receiving the unique identifier, and wherein the unauthorized single media content stream is communicated to the program content generation system in response to the authorization.

18. The media content system of claim 15, further comprising:
a media content stream interface configured to generate a special service transport channel, wherein the authorized single media content stream resides in the special service transport channel.

19. The media content system of claim 18, further comprising:
a satellite antenna configured to uplink a satellite signal to a satellite, wherein the satellite signal includes the special service transport channel,
wherein the client receives the single media content stream of interest from the satellite.

20. The media content system of claim 18, further comprising:
an interface communicatively coupled to a cable system,
wherein the client receives the single media content stream of interest from the cable system.

* * * * *